United States Patent
Tanaka (10) Patent No.: US 7,104,705 B2
(45) Date of Patent: Sep. 12, 2006

(54) OPTICAL CONNECTOR FOR REDUCING NOISE

(75) Inventor: Shinya Tanaka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/847,458

(22) Filed: May 18, 2004

(65) Prior Publication Data

US 2005/0002620 A1    Jan. 6, 2005

(30) Foreign Application Priority Data

Jul. 3, 2003    (JP)    ............................. 2003-190904

(51) Int. Cl.
*G02B 6/36*    (2006.01)

(52) U.S. Cl. ............................. 385/92; 385/53; 385/88; 385/94

(58) Field of Classification Search .................. 385/53, 385/88, 92, 94
See application file for complete search history.

(56) References Cited

U.S. PATENT DOCUMENTS 6,213,651 B1    4/2001    Jiang et al.

6,341,899 B1 *    1/2002    Shirakawa et al. ........... 385/88
6,499,889 B1    12/2002    Shirakawa et al.
2002/0012238 A1 *    1/2002    Takahashi et al. .......... 361/796

FOREIGN PATENT DOCUMENTS

| EP | 1 102 097 A | 5/2001 |
|---|---|---|
| EP | 1 217 407 A | 6/2002 |
| EP | 1 255 143 A | 11/2002 |
| JP | 2002-23027 | 1/2002 |

* cited by examiner

*Primary Examiner*—Brian Healy
*Assistant Examiner*—Jerry Martin Blevins
(74) *Attorney, Agent, or Firm*—Armstrong, Kratz, Quintos, Hanson & Brooks, LLP (57) ABSTRACT

A receptacle (1) as an optical connector includes a housing (5) having a box-like shape, said housing (5) being made of synthetic resin, an optical receiving device (7a) and an optical transmitting device (7b) as an optical transmitting and receiving module, a module case (8), and a shield case (9) The housing (5) includes a container. Each of the optical receiving and transmitting devices (7a), (7b) includes a main body (15a), (15b) having a photoelectric converter. The module case (8) receives the main bodies (15a), (15b). The shield case (9) includes a holder (19) into which the module case (8) is inserted through an opening (25). The shield case (9) only receives the module case (8). The shield case (9) is received by the container and attached to the housing (5).

4 Claims, 6 Drawing Sheets

OPTICAL CONNECTOR FOR REDUCING NOISE

FIELD OF THE INVENTION

This invention relates to an optical connector to optically interconnect an optical fiber with optical transmitting and receiving modules.

DESCRIPTION OF THE RELATED ART

Generally, a wire harness having a set of electric wires is used for connecting an auxiliary device in a vehicle. Recently, there is a problem that the wire harness increases in size and weight as the number of auxiliary devices and corresponding circuits increase. For solving this problem, a fiber optic communications system, which sends signals to the auxiliary devices by using an optical fiber cable as a part of the wire harness, has been proposed.

Figure 8:
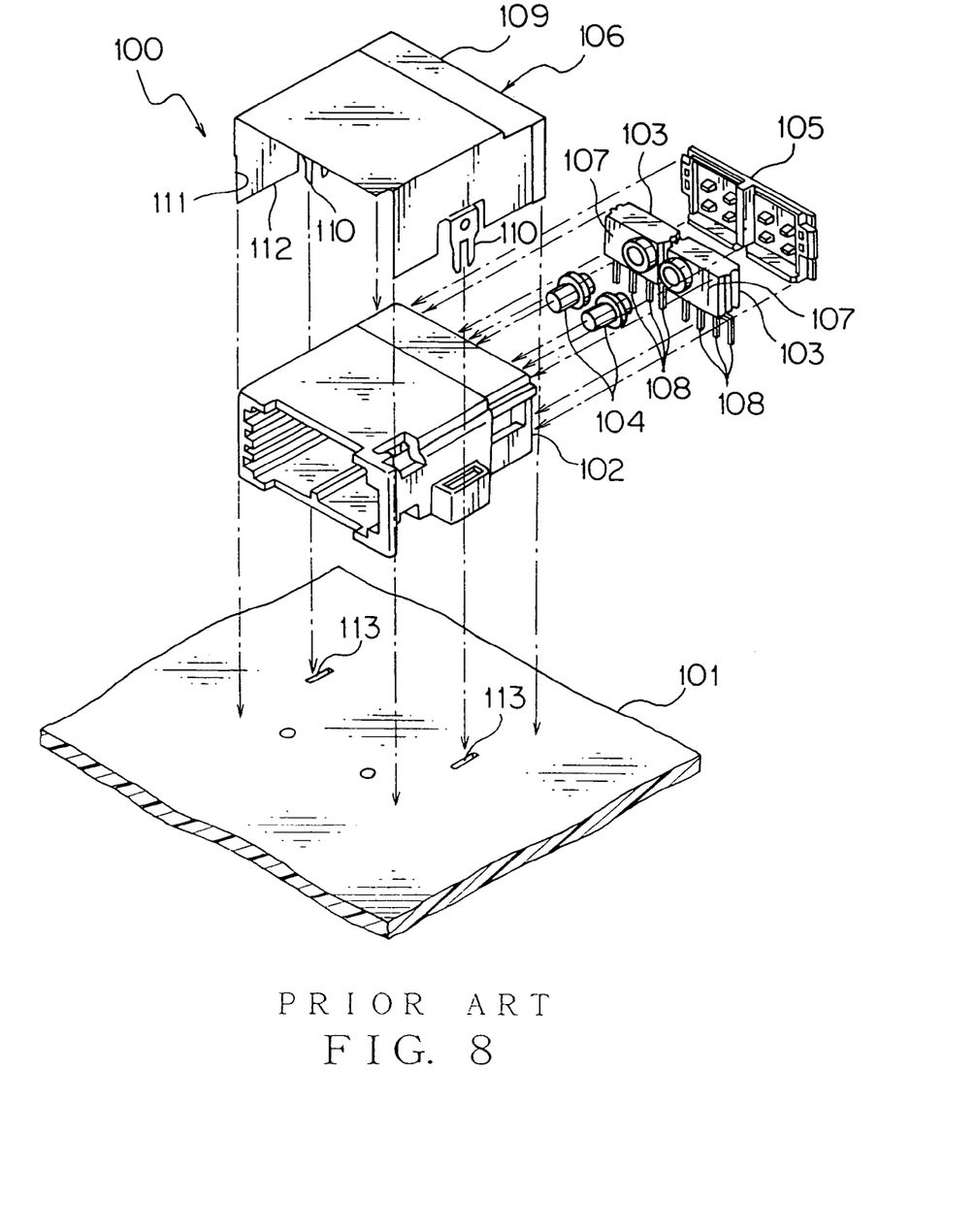
FIG. 8 an exploded perspective view showing a receptacle as a conventional optical connector.

As shown in FIG. 8, Japanese Patent Application Laid-Open No. 2002-23027 discloses a receptacle 100, as an optical connector for use in said fiber optic communications system. Said optical connector converts the signal light transmitted through the optical fiber cable to an electrical signal, and the electrical signal to an optical signal emitted into the optical fiber cable.

As shown in FIG. 8, a not-shown optical plug (a connector at an optical fiber side), as a mating optical connector, is engaged with said receptacle 100. Further, the receptacle 100 is attached to a printed circuit board 101, which is one of external electronic parts. The receptacle 100 includes a housing 102 made of synthetic resin, optical transmitting and receiving modules 103, 103, a pair of sleeves 104, a module cap 105 and a shield case 106.

The housing 102 is made of conductive synthetic resin, and has a box-like shape. The housing 102 has a pair of open containers on an outer wall arranged at a far side in FIG. 8. Further, the optical plug as described above is engaged with the housing 102 at a near side in FIG. 8.

Each of the optical transmitting and receiving modules 103, 103 includes a main body 107 with a built-in photo-electric converter, and a plurality of terminals 108 projecting from the main body 107. The container receives the main body 107. When the container receives the main body 107, the terminals 108 project outward from the housing 102. The terminals 108 are electrically connected to the photoelectric converter. The terminals 108 are electrically connected to a not-shown conductive pattern of the printed circuit board 101.

Each of a pair of sleeves 104 is made of conductive material, having a cylinder-like shape, and is inserted into a not-shown receiving tube to be attached to the housing 102. Each of the sleeves 104 has a core and a clad having different indices and being arranged coaxially.

The pair of sleeves 104 are respectively arranged in between the pair of optical fibers of the optical plug engaged with said housing 102 and the photoelectric converters of the pair of optical transmitting and receiving modules 103, 103. The sleeves 104 optically connect the optical fibers to the optical transmitting and receiving modules 103, 103 respectively.

The module cap 105 has a plate-like shape, and is attached to an opening of the container on an outer wall of the housing 102. When the module cap 105 is attached to the housing 102, the module cap 105 covers the optical transmitting and receiving modules 103, 103, together with the housing 102.

The shield case 106 is made of conductive sheet metal, and includes a main body 109 covering the housing 102 and locking projections 110 integrally, said locking projections 110 being continued to the main body 109, and projecting from the main body 109 toward the printed circuit board 101. The main body 109 has a box-like shape, and a plurality of openings 111, 112.

The housing 102 is inserted into an interior of the main body 109 through one opening 112 of the two openings 111, 112. Then, the main body 109 receives the whole housing 102. When the main body 109 receives the housing 102, the other opening 111 of the main body 109 overlaps an opening into which the optical plug is inserted. When being locked in a hole 113 on the printed circuit board 101, the locking projections 110 are electrically connected to the conductive pattern on the printed circuit board 101. Further, the shield case 106 is electrically connected to the housing 102.

The optical plug has the pair of optical fibers and the pair of ferrules, and a plug housing made of synthetic resin. Said pair of optical fibers is arranged in parallel to each other. The optical fibers are covered with the pair of ferrules respectively in a state that end faces of the optical fibers are exposed. While receiving the ferrules, the plug housing engages with the housing 102.

In the receptacle 100 having above described structure, when the optical plug is engaged, the photoelectric converter of the optical receiving module of the optical transmitting and receiving modules 103, 103 receives the signal light transmitted from corresponding optical fiber through corresponding sleeve 104. Then, the optical receiving module of the optical transmitting and receiving modules 103 converts the signal to specific electrical signal. Further, in the receptacle 100, the optical transmitting module of the optical transmitting and receiving modules 103, 103 converts an electrical signal to specific signal light and emits the light toward the other sleeve to transmit the light to the other optical fiber through the other sleeve.

Further, the receptacle 100 guides external electrical noise, which is to intrude into the optical transmitting and receiving modules 103, 103 from outside, through the main body 109 of the shield case 106 and the housing 102 to the conductive pattern on the printed circuit board 101. The shield case 106 and the housing 102 prevent the external electrical noise from intruding into the optical transmitting and receiving modules 103, 103.

Further, the receptacle 100 guides internal electrical noise, which is generated by the optical transmitting and receiving modules 103, 103, through the housing 102 and the main body 109 of the shield case 106 to the conductive pattern on the printed circuit board 101. The shield case 106 and the housing 102 prevent the internal electrical noise from being emitted outward from the optical transmitting and receiving modules 103, 103.

However, in above described receptacle 100, the shield case 106 covers the whole housing 102. Therefore, the openings 111, 112 tend to be large. Therefore, it is difficult for the shield case 106 both to reduce the external noise intruding from out side completely, and to reduce the internal noise being emitted outward completely. Thus, it tends to be difficult for the shield case 106 of the receptacle 100 to completely reduce the electrical noise.

Further, the housing 102 is made of conductive synthetic resin. Therefore, in the receptacle 100, the housing 102 cannot be contacted with the terminals 108 of optical transmitting and receiving modules 103, 103. Therefore, in the receptacle 100, the terminals 108 are often not positioned completely to rattle in the housing 102. There is a fear that after the receptacle 100 is attached to the printed circuit board 101, the terminals 108 and the like may be rattled, and electrical connections between the terminals 108, namely the optical transmitting and receiving modules 103, 103, and the printed circuit board 101 may become unstable.

Therefore, a first object of this invention is to provide an optical connector which prevents electrical noise from intruding into the optical transmitting and receiving modules, and prevents the internal electrical noise from being emitted outward from the optical transmitting and receiving modules. A second object of this invention is to provide an optical connector, which connects the optical transmitting and receiving modules to external electronic parts reliably and electrically.

SUMMARY OF THE INVENTION

In order to attain the first object, according to this there is provided an optical connector made of insulating synthetic resin, and having a housing for receiving both optical transmitting and receiving modules, said connector comprising:

a module case made of insulating synthetic resin, and receiving said optical transmitting and receiving modules; and a conductive shield case having a box-like shape, and receiving only said module case through an opening thereof, said conductive shield case being attached to said housing.

In order to attain the second object in addition to said first object, according to this invention, there is provided the optical connector, wherein each of said optical transmitting and receiving modules includes a main body having a photoelectric converter and a plurality of terminals, projecting from the main body, being electrically connected to said photoelectric converter, wherein said module case receives main bodies of said optical transmitting and receiving modules, and includes locating parts to be located in between corresponding terminals of said plurality of terminals adjacent to each other when the main bodies are received by the module case.

According to this invention, preferably, there is provided the optical connector, wherein said shield case includes a first holder to receive one of said optical transmitting and receiving modules, a second holder to receive the other one of said optical transmitting and receiving modules, and a partition wall arranged between the first and second holders to partition said holders.

According to this invention, preferably, there is provided the optical connector, wherein said shield case is made of sheet metal, wherein a part of one sheet of said sheet metal forming the first holder and a part of the other sheet of said sheet metal forming the second holder overlap with each other.

According to the optical connector of this invention, the shield case receives only the module case, which receives the optical transmitting and receiving modules. Therefore, an opening of the shield case can be made smaller.

According to the optical connector of this invention, each of the locating parts is located in between corresponding terminals adjacent to each other of the optical transmitting and receiving modules. Therefore, when the terminals start to move relative to the module case, the terminals come into contact with the locating parts. Namely, the locating parts prevent the terminals from being in contact with each other.

According to the optical connector of this invention, the partition wall is provided in the shield case. Therefore, electrical noise generated by electrical signals outputted from the optical receiving module is prevented from intruding into the optical transmitting module, and electrical noise generated by electrical signals inputted into the optical transmitting module is prevented from intruding into the optical receiving module.

According to the optical connector of this invention, a part of one sheet of the sheet metal forming the first holder and a part of the other sheet of the sheet metal forming the second holder overlap with each other. Therefore, electrical noise is prevented from being emitted outward from an area where the sheets of sheet metal, which form these holders, overlap with each other.

DESCRIPTION OF THE PREFERRED EMBODIMENT

A receptacle (a connector at an electronic equipment side) as an optical connector according to one embodiment of this invention will be explained below with reference to FIGS. 1 to 7. A receptacle 1 (the connector at the electronic equipment side) is engaged with an optical plug as a not-shown mating optical connector. Said optical plug includes a pair of optical fibers, a pair of ferrules, and ferrule locking members.

The optical fiber cable includes an optical fiber made of light guiding material, and first and second sheath parts for covering the optical fiber. Said optical fiber is a well-known multi-mode plastic optical fiber having a core and a clad, of which refractive indexes are different from each other, both of which are arranged coaxially.

Each of the ferrules is made of synthetic resin. The ferrule has a cylinder-like shape of which an outer diameter changes gradually. Each ferrule is attached to an end of the optical fiber cable. Each ferrule is fastened to the optical fiber cable.

A housing is made of synthetic resin and has a box-like shape. Each plug housing receives the optical fiber cable and the fastened ferrule.

Further, an insertion hole penetrates one outer wall of the plug housing. Further, another outer wall of the plug housing includes a resilient locking arm having a locking projection for coupling with the receptacle.

The ferrule locking member is inserted into the plug housing through the insertion hole. The ferrule locking member is fixed to the plug housing by such as engaging. When being inserted into the plug housing, the ferrule locking member locks the ferrule to prevent the ferrule from dropping out from the plug housing.

Figure 1:
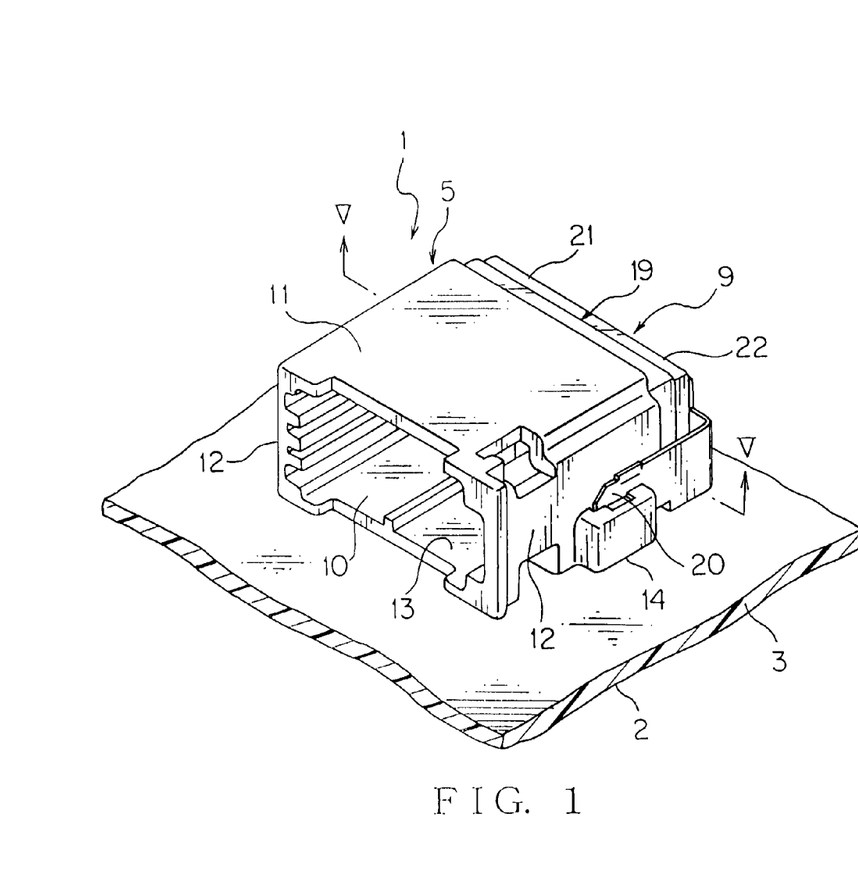
FIG. 1 is a perspective view showing a state where a receptacle as an optical connector according to one embodiment of this invention is attached to a printed circuit board.
Figure 2:
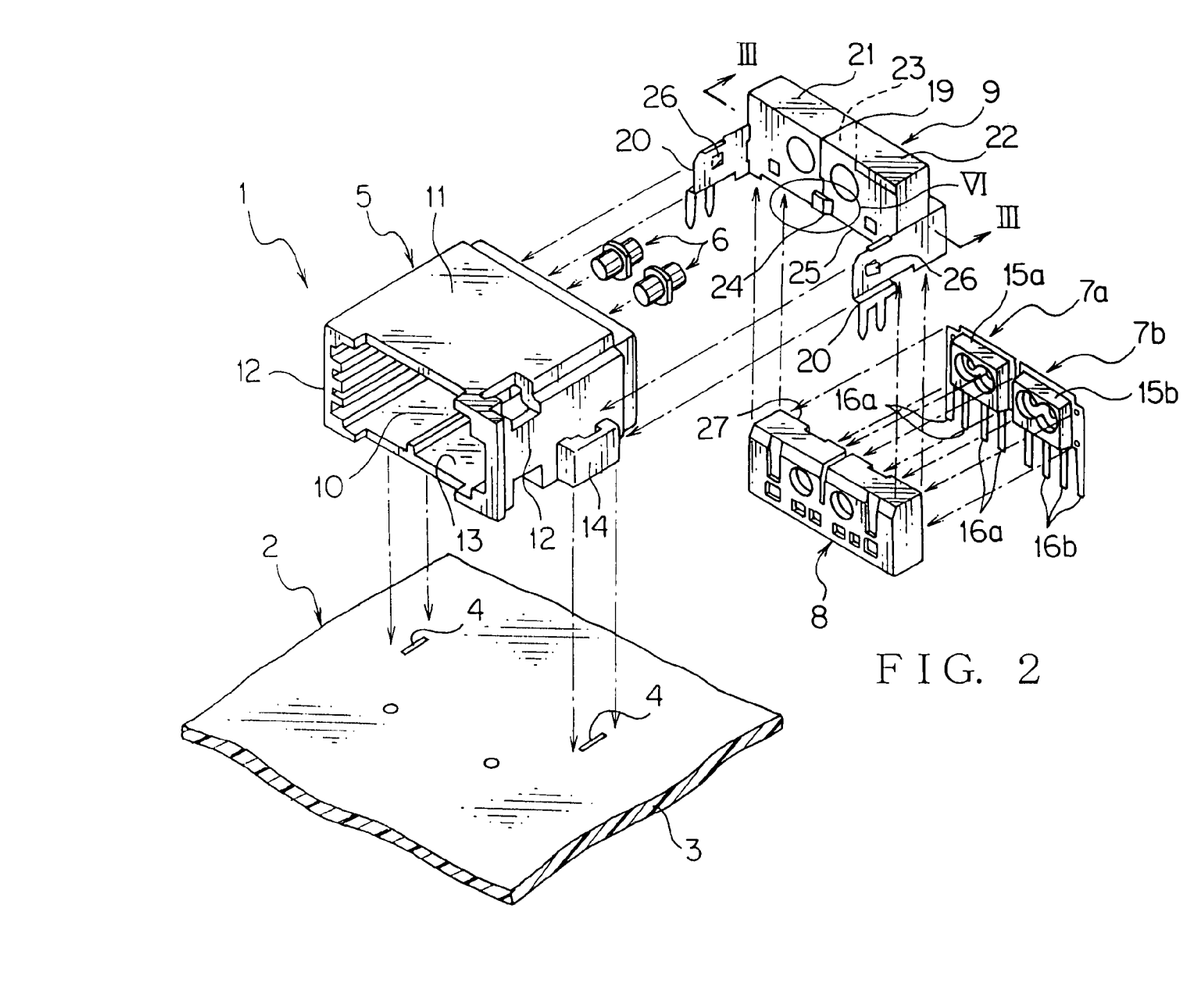
FIG. 2 is an exploded perspective view showing the receptacle according to the one embodiment of this invention.

The receptacle 1 is attached to a printed circuit board 2 (PCB) of various electronic equipment as an auxiliary device as described above. The printed circuit board 2 is one of the external electronic parts as described above. As shown in FIGS. 1 and 2, the printed circuit board 2 has an insulating substrate 3, and a not-shown conductive pattern formed on said substrate 3. The conductive pattern is made of conductive metal such as copper, formed in a thin film, and stuck on a surface of the substrate 3.

Further, a slit 4, with which a latter described earth terminal 20 is engaged, and not-shown holes, through which lead terminals 16a, 16b are inserted, are formed on the printed circuit board 2. These slit 4 and holes 16a, 16b penetrate the printed circuit board 2.

As shown in FIG. 2, the receptacle 1 includes a housing 5 made of synthetic resin, a pair of sleeves 6, an optical receiving device 7a as a fiber optical module (Fiber Optic Transceiver: FOT), an optical transmit device 7b as a fiber optical module (Fiber Optic Transceiver:FOT), a module case 8, and a shield case 9.

The housing 5 is made of synthetic resin, and as shown in FIGS. 1 and 2, has a box-like shape (tube-like shape), including a bottom wall 10 arranged along the printed circuit board 2, a ceiling wall 11 facing the bottom wall 10 with a specific space, a pair of side walls 12 facing to each other with a specific space, each of said pair of side walls 12 being continued to both the bottom wall 10 and the ceiling wall 11, and a not-shown back wall continued to back ends of these walls 11, 12, 13 in FIGS. 1 and 2, said back wall blocking one opening of the housing 5. The back wall partitions (separates) an inner space of the housing 5 into an engaging chamber 13 at near side and a container at far side of FIGS. 1 and 2.

The optical plug is inserted into the engaging chamber 13. The engaging chamber 13 is engaged with the optical plug. The container receives the optical receiving device 7a, the optical transmitting device 7a, the module case 8, and one end near the optical plug of a later described holder 19 of the shield case 9.

Further, the housing 5 includes a not-shown pair of receiving tubes formed on the back wall. Each of said pair of receiving tubes has a cylinder-like shape, of which an inner diameter is substantially equal to an outer diameter of the sleeve 6. The pair of receiving tubes is continued to the back wall, and penetrates the back wall. Further, each receiving tube communicates the engaging chamber 13 to the container.

Further, the housing 5 includes a pair of sockets 14, into which an earth terminal is pressed. Said sockets 14 are provided on each outer surface of a pair of side walls 12 of the housing 5. Later described earth terminals 20 of the shield case 9 are press-fitted into the sockets 14.

The optical receiving device 7a and the optical transmitting device 7b are received by the container, while respectively being received by the module case 8. The optical receiving device 7a converts the received light to an electrical, and includes a main body 15a received by the module case 8 and a plurality of lead terminals 16a.

The main body 15a has a flat, plate-like shape with a rectangular shape in a plane view. The main body 15a includes a photoelectric converter for receiving the signal light. When the optical receiving device 7a is received by the container while being received by the module case 8, the photoelectric converter faces an end surface of the optical fiber of the optical plug engaged with the housing 5. The photoelectric converter converts the signal light received through the optical fiber cable into an electrical signal.

One end of the lead terminal 16a is continued to the main body 15a, and the lead terminal 16a is protruded from the main body 15a. The lead terminal 16a is electrically connected to the photoelectric converter. When the container receives the optical receiving device 7a, the lead terminal 16a is protruded outward (below) from the bottom wall 10 of the housing 5. When the receptacle 1 is attached to the printed circuit board 2, the lead terminal 16a is electrically connected to the conductive pattern of the printed circuit board 2.

The optical transmitting device 7b is a device to convert an electrical signal into signal light, and includes a main body 15b received by the module case 8 and a plurality of lead terminals 16b.

The main body 15b has a flat plate-like shape with a rectangular shape in a plane view. The main body 15b includes a photoelectric converter to receive signal light. When the optical transmitting device 7b is received by the container while being received by the module case 8, the photoelectric converter faces the end surface of the optical fiber cable of the optical plug. The photoelectric converter converts the electric light into the signal light.

One end of the lead terminal 16b is continued to the main body 15b, and the lead terminal 16b is protruded from the main body 15b. The lead terminal 16b is electrically connected to the photoelectric converter. When the container receives the optical transmitting device 7b, the lead terminal 16b is protruded outward (below) from the bottom wall 10 of the housing 5. When the receptacle 1 is attached to the printed circuit board 2, the lead terminal 16b is electrically connected to the conductive pattern of the printed circuit board 2.

Each of the pair of sleeves 6 has a column-like shape, of which an outer diameter is substantially equal to an inner diameter of each receiving tube. Each sleeve 6 includes a light guide (also referred to as "wave guide") to transmit signal light. Each sleeve 6 is received by the light receiving tube, and connects the optical fiber cable of the optical plug to corresponding one of the photoelectric converters of the receiving and transmitting devices 7a, 7b.

The module case 8 is made of synthetic resin, and includes a flat box-like shape having an opening 27 at the back in FIG. 2. The optical receiving and transmitting devices 7a, 7b are inserted into the module case 8 through the opening 27. The module case 8 only receives the main bodies 15a, 15b of the optical receiving and transmitting devices 7a, 7b.

Figure 5:
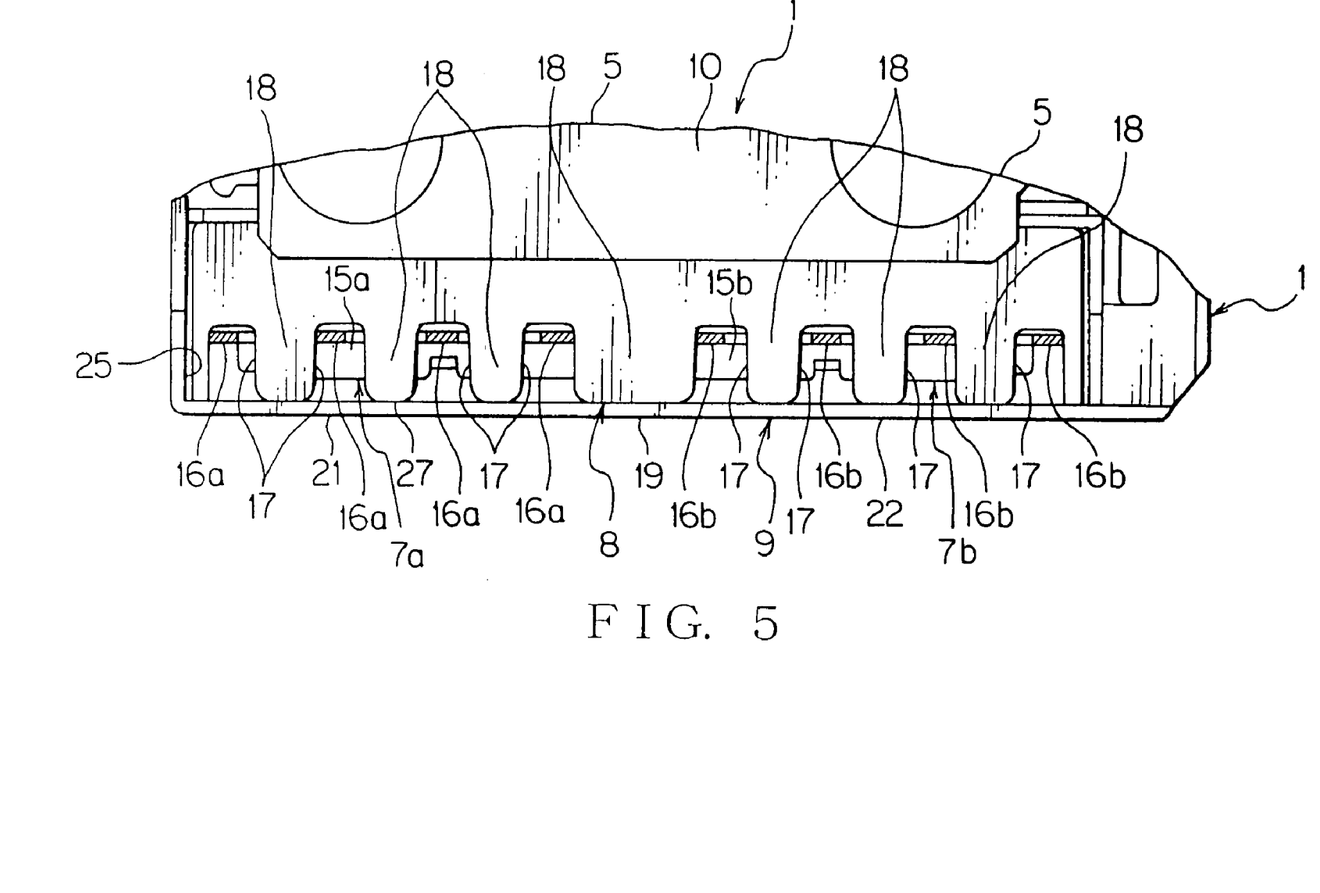
FIG. 5 is a sectional view taken along line V—V in FIG. 1, showing a relation between locating parts and lead terminals.

Further, as shown in FIG. 5, a plurality of notches 17 are formed on the module case 8. These notches 17 are formed by notching an edge of the module case 8 at the opening 27 side, namely, at a far side of the optical plug. The notches 17 are arranged along a line in which the lead terminals 16a, 16b are arranged.

When the module case 8 receives the optical receiving and transmitting devices 7a, 7b, the lead terminals 16a, 16b are arranged (passed through) respectively inside the notches 17. Therefore, when the module case 8 receives the main bodies 15a, 15b, spaces 18 between the notches 17 adjacent to each other are arranged in between the adjacent lead terminals 16a, 16b.

The spaces 18 between the notches 17 adjacent to each other correspond to the locating parts in this specification, and hereinafter are referred to as the locating parts. According to above, as shown in FIG. 5, the module case 8 includes the locating parts located respectively in between the lead terminals 16a, 16b adjacent to each other.

Figure 3:
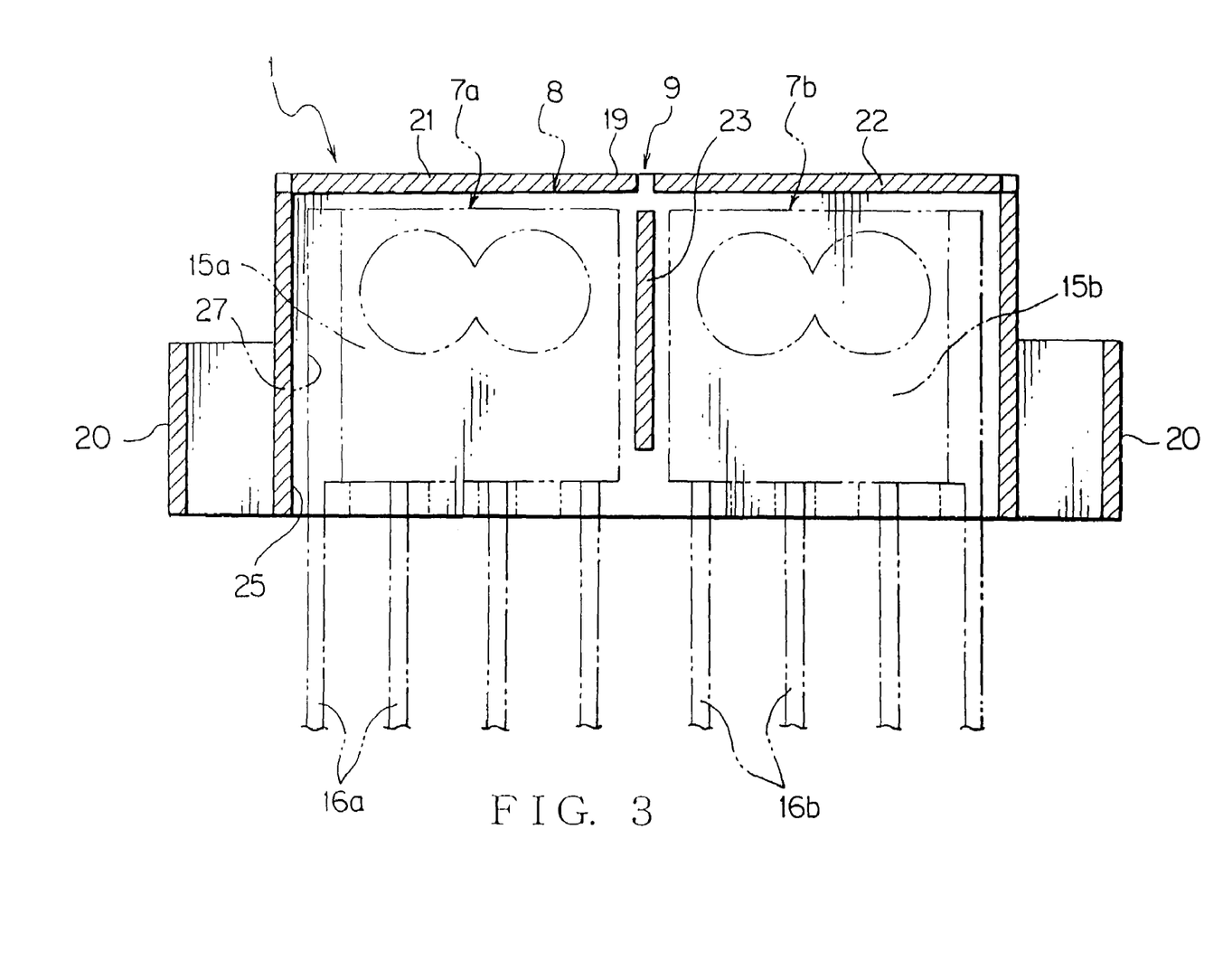
FIG. 3 is a sectional view taken along line III—III in FIG. 2, showing a shield case of the receptacle.
Figure 4:
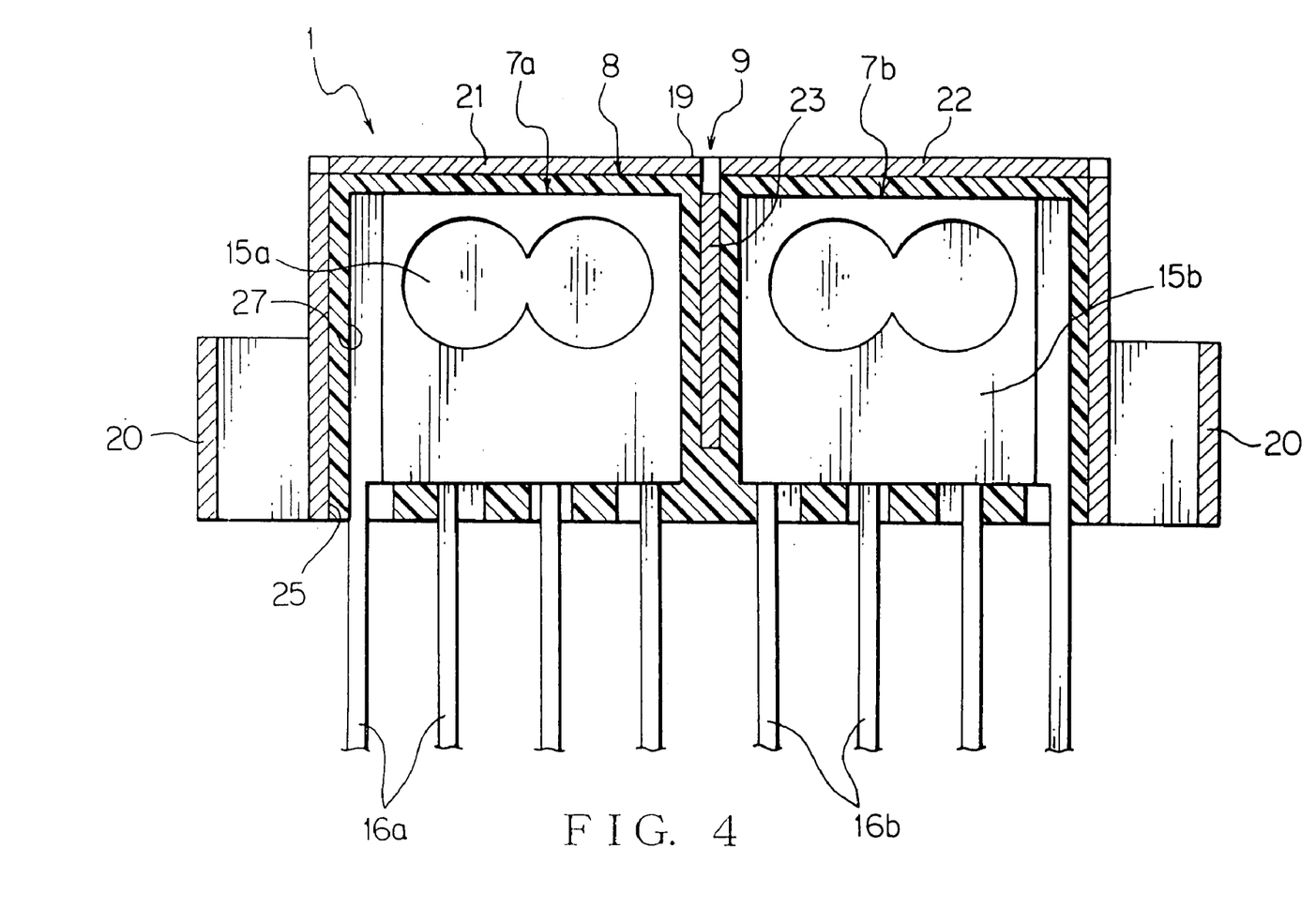
FIG. 4 is a sectional view showing a state where a module case receiving optical transmitting and receiving modules is received by the shield case shown in FIG. 3.

The shield case 9 is formed by such as bending conductive sheet metal. Namely, the shield case 9 has conductivity. As shown in FIG. 2, the shield case 9 integrally includes a holder 19 having a flat box-like shape and a pair of earth terminals 20. Since the shield case 9 includes the holder 19, the shield case 9 is described to have a box-like shape in this specification. In addition to receiving the module 8, as shown in FIGS. 3 and 4, the holder 19 includes a first holder 21, a second holder 22, a partition wall 23 formed in between the first and second holders 21, 22, and an overlapping part 24 (shown in FIGS. 6 and 7).

The first holder 21 and the second holder 22 include a flat box-like shape having an opening 25 at a bottom in the FIG. 2. The opening 25 is an opening to make interiors of the holders 21, 22 communicate with exteriors of the holders 21, 22. The first holder 21 and the second holder 22 are arranged along a line in which the main bodies 15a, 15b of the optical receiving and transmitting devices 7a, 7b are arranged.

Only the module case 8 receiving the optical receiving and transmitting devices 7a, 7b is inserted into the first and second holders 21, 22 of the holder 19 of the shield case 9. The first and second holders 21, 22 of the holder 19 of-the shield case 9 only receive the module case 8 which only receives the main bodies 15a, 15b of the optical receiving and transmitting devices 7a, 7b. Further, the first holder 21 receives one of the optical receiving and transmitting devices 7a, 7b (for example as shown in FIG. 2, the main body 15a of the optical receiving device 7a). The second holder 22 receives the other one of the optical receiving and transmitting devices 7a, 7b (for example as shown in FIG. 2, the main body 15b of the optical transmitting device 7b).

While the holder 19 having the above described structure receives the module case 8, one end at a near side in FIG. 2 of said holder 19 is received in the container of the housing 5. Further, the other end at a far side in FIG. 2 of the holder 19 is exposed to an exterior of the housing 5.

The partition wall 23 extends in a direction that the module case 8 is inserted into the first and second holders 21, 22 through the opening 25. The partition wall 23 partitions a room inside the holder 19 into the first and second holders 21, 22.

Figure 6:
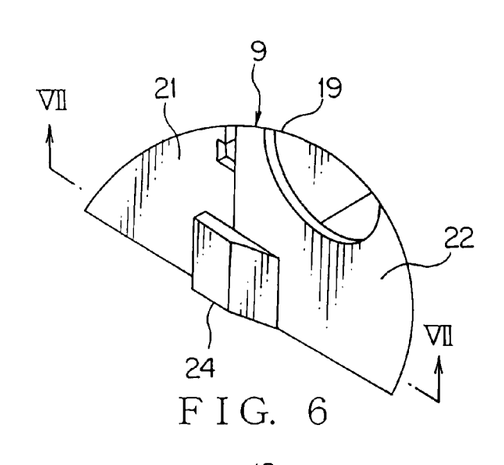
FIG. 6 is an enlarged perspective view of VI in FIG. 2.
Figure 7:
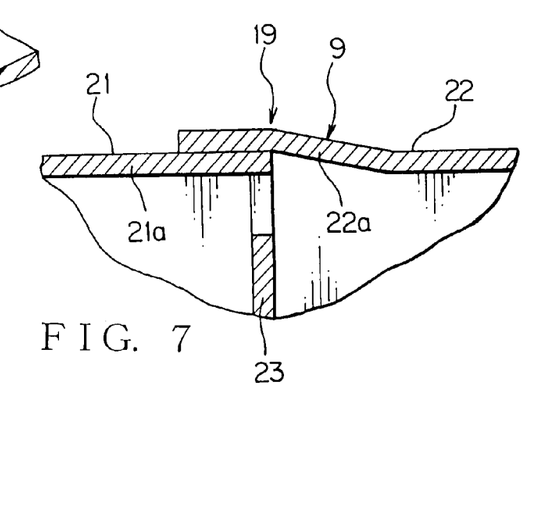
FIG. 7 is a sectional view taken along line VII—VII in FIG. 6.

As shown in FIG. 6, the overlapping part 24 is formed across the first and second holders 21, 22. The overlapping part 24 is formed at sleeves 6 side of the holder 19 at a near side in FIG. 2, namely, at the optical plug side. Further, the overlapping part 24 is formed at an edge near the printed circuit board 2, which is arranged at a bottom end in FIG. 2, of the first and second holders 21, 22. As shown in FIG. 7, the overlapping part 24 is formed by a part of one sheet 21a of sheet metal forming the first holder 21, and a part of the other sheet 22a of sheet metal forming the second holder 22, said parts overlapping with each other. Further, said parts of the sheet metals 21a, 22a are in contact with each other at the overlapping part 24.

A pair of earth terminals 20 is provided respectively on both edges of the holder 19 in a direction that the main bodies 15a, 15b are arranged in a line. Namely, the pair of earth terminals is respectively continued to the both edges in a width direction of the holder 19. The pair of earth terminals 20 has a blade-like shape extending respectively from the both edges of the holder 19 toward the printed circuit board 2. When the holder 19 of the shield case 9 is received by the container of the housing 5, the pair of earth terminals 20 is protruded from the bottom wall 10 toward a lower side of the housing 5, namely toward the printed circuit board 2.

The pair of earth terminals 20 is inserted into and engaged with the slits 4 on the printed circuit board 2 to be connected to the conductive pattern of the printed circuit board 2. The pair of earth terminals 20 is fixed on the printed circuit board 2 by such as being engaged with the printed circuit board 2. The pair of earth terminals 20 electrically connects the shield case 9 to the conductive pattern of the printed circuit board 2. The pair of earth terminals 20 electrically connects the shield case 9 to such as an earth circuit through the conductive pattern of the printed circuit board 2. Further, the pair of earth terminals 20 is pressed into sockets 14 to fix the shield case 9 to the housing 5.

Further, a locking hook 26 for locking the pair of earth terminals 20 in the sockets 14 is formed on the respective earth terminals 20 integrally. By the locking hook 26 locking the pair of earth terminals 20 in the sockets 14, the pair of earth terminals 20 fixes the shield case 9 to the housing 5.

The receptacle 1 having the above described structure is assembled as follows. A part of the sleeves 6 are inserted halfway into the light receiving tubes of the housing 5. The main bodies 15a, 15b of the optical receiving and transmitting devices 7a, 7b are inserted into the module case 8 through the opening 27. At this moment, each of locating parts 18 of the module case 8 is located in between the terminals adjacent to each other of the lead terminals 16a, 16b. Thus, the module case 8 receives the main bodies 15a, 15b of the optical receiving and transmitting devices 7a, 7b.

The module case 8 receiving the main bodies 15a, 15b is inserted into the first and second holders 21, 22 of the shield case 9 through the opening 25. The pair of earth terminals 20 is pressed into the sockets 14. The locking hooks 26 lock the pair of earth terminals 20 in the sockets 14. While the holder 19 is received inside the container of the housing 5, the shield case 9 is fixed to the housing 5.

Further, when the pair of earth terminals 20 is pressed into the sockets 14 to fix the shield case 9 to the housing 5, the shield case 9 presses the sleeves 6 toward the back of the light receiving tubes, namely the back of the housing 5. Thus, the optical receiving and transmitting devices 7a, 7b are arranged in suitable positions.

In this manner, the receptacle 1 is assembled. In this condition, the optical plug is allowed to engage with the receptacle 1. Further, for attaching the receptacle 1 to the printed circuit board 2, firstly the bottom wall 10 is placed on the printed circuit board 2. The pair of earth terminals 20 and the lead terminals 16a, 16b are inserted into the slits 4 and the holes on the printed circuit board 2. While the pair of earth terminals 20 is engaged with the slits 4 and connected electrically to the conductive pattern on the printed circuit board 2, the lead terminals 16a, 16b penetrating through the holes are fixed on the conductive pattern of the printed circuit board 2 by such as soldering. thus, the receptacle 1 is attached to the printed circuit board 2.

After the receptacle 1 is attached to the printed circuit board 2, when the optical plug is engaged with the receptacle 1, an electrical signal is supplied to the optical transmitting device 7b through the conductive pattern of the printed circuit board 2. The receptacle 1 converts the electrical signal to signal light, and emits the signal light toward one of the optical fibers of the optical plug.

In the receptacle 1, signal light is inputted into the optical receiving device 7a from the other optical fiber of the optical plug. The receptacle 1 converts the signal light received by the optical receiving device 7a to an electrical signal, and supplies the electrical signal to the conductive patterns on the printed circuit board 2 through the lead terminal 16a. Thus, the receptacle 1 converts the signal light from the optical plug to the electrical signal to supply to the printed circuit board 2, and converts the electrical signal from the printed circuit board 2 to the signal light to supply to the optical plug.

Further, the receptacle 1 discharges electrical noise, which is to intrude into the optical receiving and transmitting devices 7a, 7b from outside, into the earth circuit through the holder 19 of the shield case 9 and the pair of earth terminals 20. The receptacle 1 also discharges electrical noise, which is generated by the optical receiving and transmitting devices 7a, 7b, into the earth circuit through the holder 19 of the shield case 9 and the pair of earth terminals 20. Thus, the external electrical noise is prevented from intruding into the optical receiving and transmitting devices 7a, 7b, and the electrical noise, generated by the optical receiving and transmitting devices 7a, 7b, is prevented from being emitted outward.

According to this embodiment, the shield case 9 only receives the module case 8, which receives the main bodies 15a, 15b of the optical receiving and transmitting devices 7a, 7b. Therefore, the opening 25 of the shield case 9 can be made smaller. Therefore, it is hard for the external electrical noise to intrude into the optical receiving and transmitting devices 7a, 7b through the opening 25 of the shield case 9. Further, it is hard for the electrical noise, generated by the optical receiving and transmitting devices 7a, 7b, to be emitted outward through the opening 25. Therefore, the external electrical noise is prevented from intruding into the optical receiving and transmitting devices 7a, 7b, and the electrical noise, generated by the optical receiving and transmitting devices 7a, 7b, can be prevented from being emitted outward.

Each of locating parts 18 of the module case 8 is located in between the terminals adjacent to each other of the lead terminals 16a, 16b. Therefore, when the lead terminals 16a, 16b start to move in the module case 8, they are blocked by the locating parts 18 to be prevented from moving in the module case 8.

Therefore, the lead terminals 16a, 16b can be prevented from rattling in the module case 8, namely in the housing 5, and an electrical connection between these lead terminals 16a, 16b and the printed circuit board 2 as one of external electronic parts can be prevented from being unstable. Therefore, the optical receiving and transmitting devices 7a, 7b can be connected electrically and reliably to the printed circuit board 2. Further, the locating parts 18 prevent the lead terminals 16a, 16b from being in contact with each other. Therefore, the locating parts 18 prevent the lead terminals 16a, 16b from being short-circuited to each other.

The partition wall 23 is formed on the shield case 9. Therefore, electrical noise, which is generated by electrical signal outputted from the optical receiving device 7a to the printed circuit board 2, is prevented from intruding into the optical transmitting device 7b. Further, electrical noise, which is generated by electrical signal inputted into the optical transmitting device 7b, is prevented from intruding into the optical receiving device 7a. Therefore, electrical noises of the optical receiving and transmitting devices 7a, 7b affecting each other can be reduced to improve cross-talk characteristics of the receptacle 1.

At the overlapping part 24, a part of the sheet metal 21a forming the first holder 21 and a part of the sheet metal 22a forming the second holder 22 overlap with each other. Therefore, the receptacle 1 can prevent electrical noise from being emitted outward from an overlapping part 24 where the sheet metals 21a, 22a, forming these holders 21, 22 respectively, overlap with each other. Therefore, the receptacle 1 can reliably prevent the electric noise generated by the optical receiving and transmitting devices 7a, 7b from being emitted outward.

The embodiments described above only illustrate representative embodiments, and this invention is not limited to these embodiments. Namely, this invention may be employed in various and numerous embodiments without departing from the scope of the invention.

What is claimed is:

1. An optical connector made of insulating synthetic resin, and having a housing which receives both optical transmitting and receiving modules, said optical connector comprising:
    a module case made of insulating synthetic resin, and receiving said optical transmitting and receiving modules; and
    a conductive shield case, made of sheet metal, having a box-like shape, and receiving only said module case through an opening thereof, said conductive shield case being attached to said housing;
    wherein said shield case includes a first holder to receive one of said optical transmitting and receiving modules, a second holder to receive the other one of said optical transmitting and receiving modules, and a partition wall arranged between the first and second holders to partition said holders, and
    a part of one sheet of said sheet metal forming the first holder and a part of the other sheet of said sheet metal forming the second holder overlap with each other, so as to prevent electrical noise generated by the optical transmitting and receiving modules from being emitted outward.

2. An optical connector made of insulating synthetic resin, and having a housing which receives both optical transmitting and receiving modules, said optical connector comprising:
    a module case made of insulating synthetic resin, and receiving said optical transmitting and receiving modules; and a conductive shield case having a box-like shape, and receiving only said module case through an opening thereof, said conductive shield case being attached to said housing;

wherein each of said optical transmitting and receiving modules includes a main body having a photoelectric converter and a plurality of terminals, projecting from the main body, being electrically connected to said photoelectric converter, wherein said module case receives main bodies of said optical transmitting and receiving modules, and includes locating parts to be located between corresponding terminals of said plurality of terminals adjacent to each other when said main bodies are received by the module case.

3. The optical connector as claimed in claim 2, wherein said shield case includes a first holder to receive one of said optical transmitting and receiving modules, a second holder to receive the other one of said optical transmitting and receiving modules, and a partition wall arranged between the first and second holders to partition said holders.

4. The optical connector as claimed in claim 3, wherein said shield case is made of sheet metal, and wherein a part of one sheet of said sheet metal forming the first holder and a part of the other sheet of said sheet metal forming the second holder overlap with each other.

* * * * *